US006771779B1

(12) United States Patent
Eriksson et al.

(10) Patent No.: US 6,771,779 B1
(45) Date of Patent: Aug. 3, 2004

(54) SYSTEM, APPARATUS, AND METHOD FOR IMPROVING SPEECH QUALITY IN MULTI-PARTY DEVICES

(75) Inventors: Anders Eriksson, Uppsala (SE); Erik Ekudden, Akersberga (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 519 days.

(21) Appl. No.: 09/675,463

(22) Filed: Sep. 28, 2000

(51) Int. Cl.[7] ................................................ H04R 5/00
(52) U.S. Cl. .................... 381/20; 381/17; 379/202.01
(58) Field of Search ............................. 381/20, 1, 66, 381/17, 18, 19; 379/406.01, 406.02, 202.01

(56) References Cited

U.S. PATENT DOCUMENTS 5,208,786 A    5/1993  Weinstein et al. .......... 367/124
5,889,857 A  * 3/1999  Boudy et al. ............... 379/410
6,577,731 B1 * 6/2003  Sugiyama ............... 379/406.01

FOREIGN PATENT DOCUMENTS

GB    2336968 A  *  3/1999  .......... H04M/1/274

OTHER PUBLICATIONS

European Standard Search Report, File: RS 105763 US, Jun. 11, 2001, pp. 1–4.

* cited by examiner

*Primary Examiner*—Melur Ramakrishnaiah

(57) ABSTRACT

A system and method is disclosed to remove cross talk terms from speech signals in a multi-party conference system using an estimator to first estimate the respective cross talk terms for each of the said plurality of users. In one embodiment, these terms are then multiplied with a filter based on the estimated cross talk terms. Source speech signals may thereby be recovered from the plurality of multi-party conference users without the cross talk.

49 Claims, 3 Drawing Sheets

SYSTEM, APPARATUS, AND METHOD FOR IMPROVING SPEECH QUALITY IN MULTI-PARTY DEVICES

BACKGROUND OF THE INVENTION

1. Technical Field of the Invention

The present invention is directed to systems, devices, and methods for improving noise reduction in multi-party telephone systems.

2. Description of Related Art

As technology proceeds into the twenty-first century, electronic communication methods grow exceedingly important in allowing efficient, inexpensive transfer of information. In particular, multi-party conferencing for a telecommunications system allows several individuals in different locations to participate in group discussions via, for example, conference bridges. Within a multi-party bridge, the incoming microphone signals from the different parties are digitally mixed and transmitted to the respective loudspeakers of the different parties. An alternative approach is to send all microphone signals of the respective users.

A major problem posed by multi-party telecommunication, systems, however, is the attenuation of background noise in the transmitted signal. This noise may be caused by either disturbance from the external environment, or internal noise produced within the system (i.e., talker and listener echoes). Prior implementations of multi-party bridges attempt to resolve this issue by only mixing the incoming signals from a fixed subset of the parties. This choice, however, is typically performed on the basis of signal level and speaker activity of the different parties, where the most recent active talkers are retained if no speaker activity is present from any other party. Although this solution reduces external background noise, it still poses the problem of re-transmission, in which the microphone re-transmits audio signals produced by the speaker, resulting in echoes and sustained feedback oscillations.

Previous methods of echo suppression include disabling, or substantially attenuating, one of the respective send and receive telecommunication channels in favor of the other. This approach, however, often results in undesirable clipping of voice signals during a conversation. Additionally, background noises are often completely muted during pauses in the conversation, such that a user may perceive it as a disconnected call.

In view of the current state of the art, as described above, a modification to the basic operation of mixing incoming signals from a fixed subset of parties is needed, such that the microphone signal coming from a first party A (or a number of parties) may be excluded from the sum of the signals transmitted back to party A (or to the number of parties). One reason for this is that the microphone signal from A may already be present in the loudspeaker of a talking party A (due to the side-tone in the telephone set), and that, if a significant transmission delay is present in the system, the microphone signal will be perceived as an undesirable echo.

There is therefore a need for improved techniques for noise reduction in multi-party telephone systems.

SUMMARY OF THE INVENTION

A method, system, and apparatus are provided, such that cross talk terms may be removed from speech signals in a multi-party conference system, having a plurality of users. This is accomplished by first estimating the respective cross talk terms for each of the said plurality of users. These terms are then used for controlling the transmission of speech and audio signals between the users. In one approach, the transmission input speech signals are multiplied by time varying scalars, e.g., taking the values 0 and 1 (on and off), thereby controlling the acoustic cross talk terms. In another approach, line cross talk terms are inverted and multiplied to input speech signals, in effect filtering the input speech signals, such that respective source speech signals may be recovered from said plurality of multi-party conference users.

In the case of separation of sources, the signals are separate; thus original speech signals are not recovered. Instead, signals are filtered versions and not identical to the corresponding source speech signals.

BRIEF DESCRIPTION OF THE DRAWINGS

A more complete understanding of the various methods and arrangements of the present invention may be obtained by reference to the following Detailed Description when taken in conjunction with the accompanying Drawings wherein.

DETAILED DESCRIPTION OF PRESENTLY PREFERRED EXEMPLARY EMBODIMENTS OF THE INVENTION

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
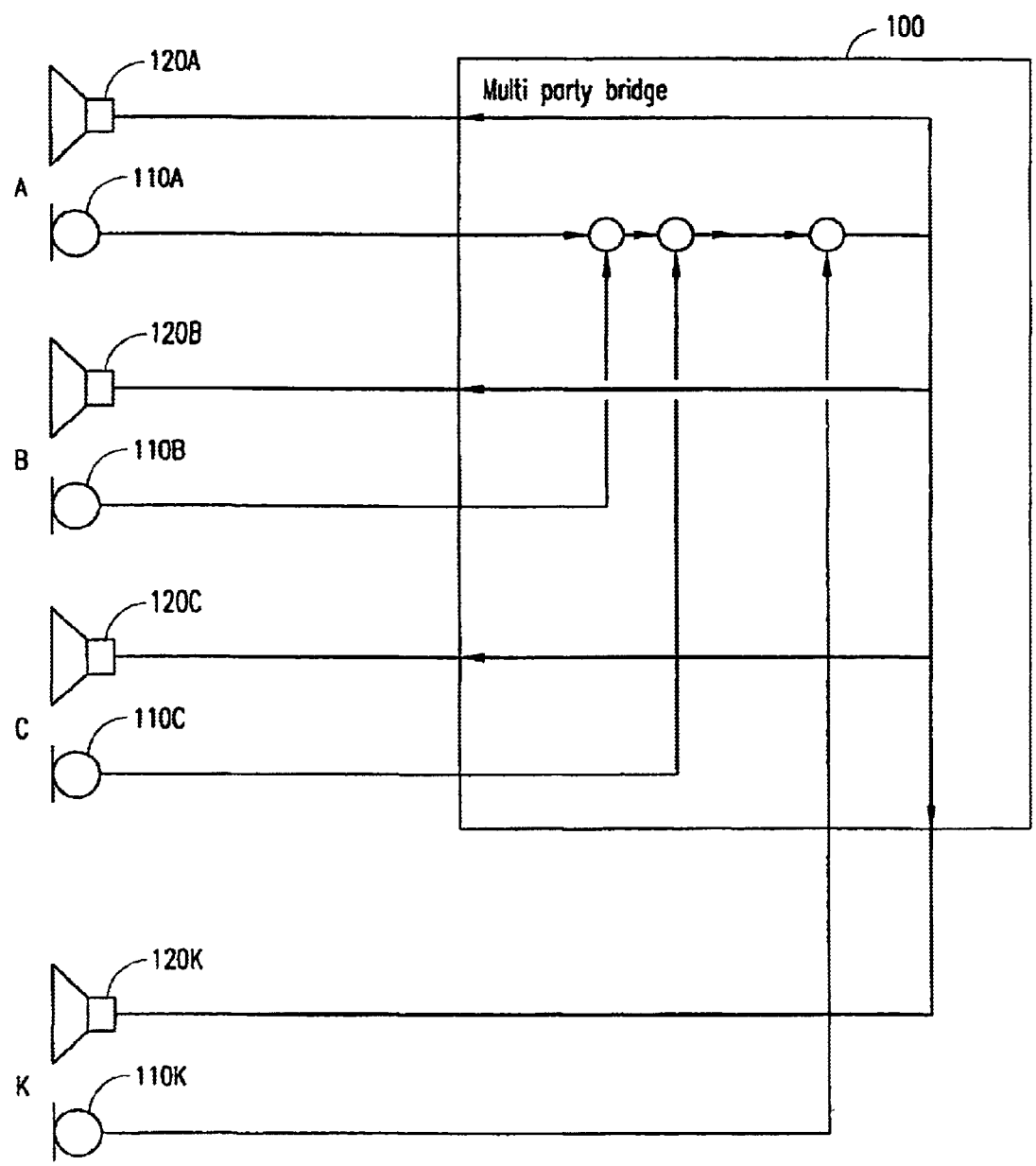
FIG. 1 illustrates a conference call device, which may be employed in implementing the advances of the present invention.

As noted herein above, teleconferencing is an increasingly important aspect of business communications. Shown in FIG. 1 is an exemplary multi-party bridge, generally designated in the figure by the reference number 100, such as may be used in a land line or cellular telecommunications system, which further illustrates the aforementioned echo problem. A number of conference participants, A, B, C, and K, as illustrated, each have a microphone, respectively designated by the reference identifiers 110A, 110B, 110C, and 110K. Sounds from each of the microphones feed into the bridge 100, as illustrated, and lead outwards to respective speakers 120A, 120B, 120C, and 120K.

The proliferation of mobile terminals has exacerbated the inherent problem of noise feedback due to acoustical cross talk, i.e., situations in which two or more users within a conference call are positioned in the same location. Under these circumstances, the speech from a user A will also be present as input to the microphone of a simultaneous user B. With a significant transmission delay (as present in cellular or IP-based networking), this signal coming from the microphone of user B introduces an undesirable talker echo to user A. Furthermore, the microphone signal from user A is transmitted to the loudspeaker of user B. Due to the direct path of the voice between talker A and user B, however, this may, with a significant transmission delay in the system, cause that user B to experience a listener echo of talker A. Similarly, if both the microphone signals from users A and B are transmitted to the other parties, this signal may contain an undesirable listener echo of talker A.

The scenario described above is given to illustrate the basic problem. Needless to say, in a real situation any number of the users in the multi party call may experience this problem. Furthermore, due to the mobility of the users, the problems described may only occur during parts of the call.

Mathematically, the problems described can be formalised as follows: let $s_A(t), \ldots, s_K(t)$ denote the speech from talker A through talker K, respectively. The digital input samples to the multi party bridge can then be expressed as follows:

$$\begin{pmatrix} x_A(n) \\ x_B(n) \\ \vdots \\ x_K(n) \end{pmatrix} = \begin{pmatrix} H_A(z) & H_{BA}(z) & \ldots & H_{KA}(z) \\ H_{AB}(z) & H_B(z) & \ldots & H_{KB}(z) \\ \vdots & \vdots & \ddots & \vdots \\ H_{AK}(z) & H_{BK}(z) & \ldots & H_K(z) \end{pmatrix} \cdot \begin{pmatrix} s_A(n) \\ s_B(n) \\ \vdots \\ s_K(n) \end{pmatrix}$$

where $s_A(n), \ldots, s_K(n)$ denotes a discrete time sequence of the speech signals, $H_A(Z), \ldots, H_K(z)$ denotes the transfer function from talker A through K to the respective microphone, and $H_{i,j}(z), i=A, \ldots, K, j=A, \ldots, K, i \neq j$, etc. denotes the transfer function of the cross talk from talker i to the microphone of user j.

Let $y_A(t), \ldots, y_K(t)$ denote the signal: transmitted from the multi-party bridge to the different parties. In the basic design alluded to in the previous section, the output signals can be expressed as follows:

$$\begin{pmatrix} y_A(n) \\ y_B(n) \\ \vdots \\ y_K(n) \end{pmatrix} = \begin{pmatrix} c_A & c_{BA} & \ldots & c_{KA} \\ c_{AB} & c_B & \ldots & c_{KB} \\ \vdots & \vdots & \ddots & \vdots \\ c_{AK} & c_{BK} & \ldots & c_K \end{pmatrix} \cdot \begin{pmatrix} x_A(n) \\ x_B(n) \\ \vdots \\ x_K(n) \end{pmatrix}$$

where the variables $c_{i,j}$ denotes the feedback from input i to the output j. Typically, in order to reduce the background noise in the loudspeaker signal, a limited number of elements $c_{i,j}$ (column wise with respect to talker activity) are set to 1 whereas the other are set to 0 or a small value. Furthermore, the direct feedback $c_A, \ldots, c_K$ is preferably set to 0 in order not to introduce any talker echo.

In an ideal situation, and in situations where the users not are in the same locations, the cross talk between the different microphones should equal zero, i.e., $H_{i,j}(z)=0$, and the transmitted signals equal:

$$\begin{pmatrix} y_A(n) \\ y_B(n) \\ \vdots \\ y_K(n) \end{pmatrix} = \begin{pmatrix} c_A & c_{BA} & \ldots & c_{KA} \\ c_{AB} & c_B & \ldots & c_{KB} \\ \vdots & \vdots & \ddots & \vdots \\ c_{AK} & c_{BK} & \ldots & c_K \end{pmatrix} \cdot \begin{pmatrix} H_A(z)s_A(n) \\ H_B(z)s_B(n) \\ \vdots \\ H_K(z)s_K(n) \end{pmatrix}$$

which is simply a combination of the speech from the different talkers filtered by the frequency response of the corresponding microphone and speech path.

However, in the problematic situation where two or more users are in the same location, some cross talk terms $H_{i,j}(z)$ differs from 0, and the transmitted signals equal, i.e.:

$$\begin{pmatrix} y_A(n) \\ y_B(n) \\ \vdots \\ y_K(n) \end{pmatrix} =$$

-continued
$$\begin{pmatrix} c_A & c_{BA} & \ldots & c_{KA} \\ c_{AB} & c_B & \ldots & c_{KB} \\ \vdots & \vdots & \ddots & \vdots \\ c_{AK} & c_{BK} & \ldots & c_K \end{pmatrix} \cdot \begin{pmatrix} H_A(z) & H_{BA}(z) & \ldots & H_{KA}(z) \\ H_{AB}(z) & H_B(z) & \ldots & H_{KB}(z) \\ \vdots & \vdots & \ddots & \vdots \\ H_{AK}(z) & H_{BK}(z) & \ldots & H_K(z) \end{pmatrix} \cdot \begin{pmatrix} s_A(n) \\ s_B(n) \\ \vdots \\ s_K(n) \end{pmatrix}$$

and can be seen to contain several cross terms which may give rise to the talker and listener echo problems described above.

A general solution to the noise problem described herein above pursuant to the present invention, is to remove the cross talk terms by filtering the input signals. This may be accomplished by multiplying the input signals with a filter based on an estimate of the matrix containing the cross talk terms. Alternatively, cross talk may be detected and transmission of microphone signals may then be controlled from a plurality of users, based on the detected cross talk.

Figure 2:
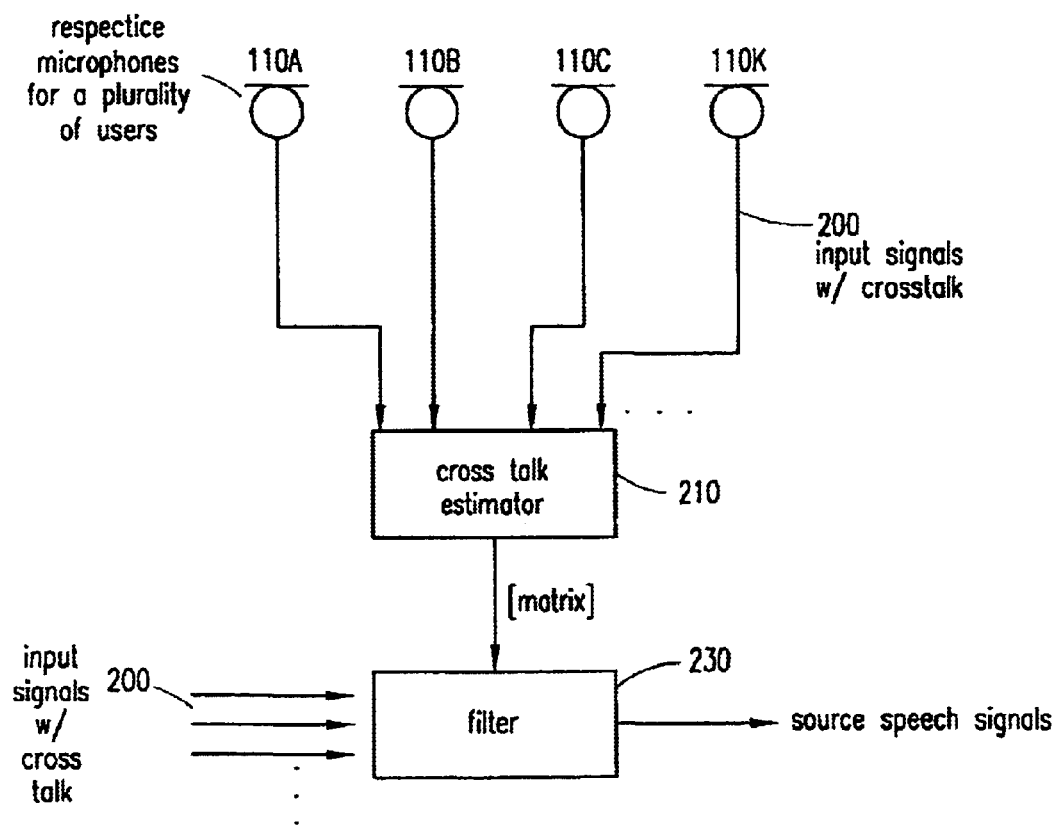
FIG. 2 is a simplified flow diagram of an exemplary method which may be used to implement the preferred embodiment of the present invention.

FIG. 2 is a simplified flow diagram of an exemplary method that can be used to implement the preferred embodiment of the present invention. Input signals 200 with cross talk are received at an estimator 210 from the respective microphones 110A, 110B, 110C, and 110K of a plurality of multi-party conference users. The estimator 210 calculates a matrix of cross talk terms corresponding to the cross talk present in the input signals. The matrix of estimated cross talk terms is then sent through a filter 230 to remove cross talk from input signals containing cross talk. The filter 230 is essentially based on the estimated cross talk.

The aforementioned approach can be used for separation of sources, where the original speech signals not have been recovered, but that the signals have been separated so that the signals $z_A(n), \ldots, z_K(n)$, in other words:

$$\begin{pmatrix} z_A(n) \\ z_B(n) \\ \vdots \\ z_K(n) \end{pmatrix} = D(z) \cdot \begin{pmatrix} H_A(z) & H_{BA}(z) & \ldots & H_{KA}(z) \\ H_{AB}(z) & H_B(z) & \ldots & H_{KB}(z) \\ \vdots & \vdots & \ddots & \vdots \\ H_{AK}(z) & H_{BK}(z) & \ldots & H_K(z) \end{pmatrix} \cdot \begin{pmatrix} s_A(n) \\ s_B(n) \\ \vdots \\ s_K(n) \end{pmatrix}$$

$$D(z) = \begin{pmatrix} D_{AA}(z) & \ldots & D_{KA}(z) \\ \vdots & \ddots & \vdots \\ D_{AK}(z) & \ldots & D_{KK}(z) \end{pmatrix}$$

are filtered versions, but not identical, of the corresponding source speech signals $s_A(n), \ldots, s_K(n)$.

Figure 3:
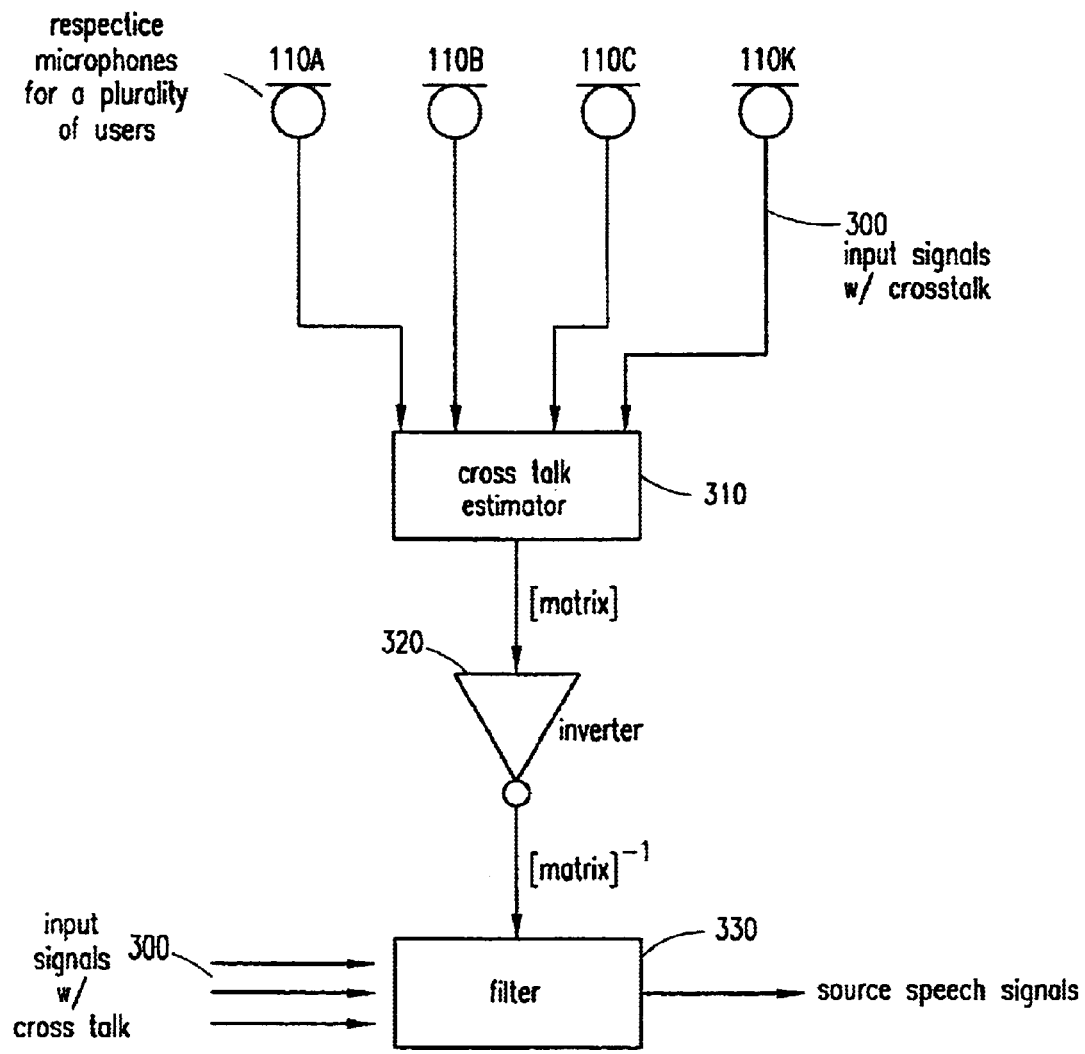
FIG. 3 is a flow diagram illustrating an alternative embodiment of the present invention.

In an alternative embodiment of the present invention, as illustrated in FIG. 3, input signals 300 with cross talk are received at an estimator 310 from the microphones 110A, 110B, 110C, and 110K of a plurality of multi-party conference users. A matrix of cross talk terms, corresponding to cross talk terms in the input signals, is calculated by the estimator 310. This matrix is then sent through an inverter 320 which inverts the matrix. The output of this function yields inverted estimated cross talk terms, i.e., a matrix, which may be utilized as a filter 330 to remove cross talk terms from input signals containing cross talk, thereby producing the original source speech signals. Mathematically, this may be formalized as:

$$\begin{pmatrix} y_A(n) \\ y_B(n) \\ \vdots \\ y_K(n) \end{pmatrix} =$$

-continued $$\begin{pmatrix} c_A & c_{BA} & \ldots & c_{KA} \\ c_{AB} & c_B & \ldots & c_{KB} \\ \vdots & \vdots & \ddots & \vdots \\ c_{AK} & c_{BK} & \ldots & c_K \end{pmatrix} \cdot \hat{G}(z) \cdot \begin{pmatrix} H_A(z) & H_{BA}(z) & \ldots & H_{KA}(z) \\ H_{AB}(z) & H_B(z) & \ldots & H_{KB}(z) \\ \vdots & \vdots & \ddots & \vdots \\ H_{AK}(z) & H_{BK}(z) & \ldots & H_K(z) \end{pmatrix} \cdot \begin{pmatrix} s_A(n) \\ s_B(n) \\ \vdots \\ s_K(n) \end{pmatrix}$$

where $\hat{G}(z)$ denotes an estimate of the inverse of the cross talk matrix, as follows:

$$\hat{G}(z) = \begin{pmatrix} \hat{H}_A(z) & \hat{H}_{BA}(z) & \ldots & \hat{H}_{KA}(z) \\ \hat{H}_{AB}(z) & \hat{H}_B(z) & \ldots & \hat{H}_{KB}(z) \\ \vdots & \vdots & \ddots & \vdots \\ \hat{H}_{AK}(z) & \hat{H}_{BK}(z) & \ldots & \hat{H}_K(z) \end{pmatrix}^{-1}$$

This would lead to a perfect recovering of the source speech signals $s_A(n), \ldots, s_K(n)$.

It should be understood that the algorithms designed for recovering/separation of the sources are very computationally demanding, particularly so since the unknown transfer functions $H_{i,j}(z), i=A, \ldots, K, j=A, \ldots, K, i \neq j$ may have a large order and vary with time.

It should be understood that the estimation of any possible cross talk need to be constantly updated, due to the possible mobility of the users.

In the following, a computationally efficient procedure for mitigating the effects of the correlation between the source speech signal in different input signals to the bridge, in accordance with FIG. 1, is outlined. The method is based on a strategy in which a matrix with scalar variables is pre-multiplied to the received input data, $$\begin{pmatrix} y_A(n) \\ y_B(n) \\ \vdots \\ y_K(n) \end{pmatrix} = \begin{pmatrix} \rho_A(n) & \rho_{BA}(n) & \ldots & \rho_{KA}(n) \\ \rho_{AB}(n) & \rho_B(n) & \ldots & \rho_{KB}(n) \\ \vdots & \vdots & \ddots & \vdots \\ \rho_{AK}(n) & \rho_{BK}(n) & \ldots & \rho_K(n) \end{pmatrix} \cdot \begin{pmatrix} x_A(n) \\ x_B(n) \\ \vdots \\ x_K(n) \end{pmatrix}$$

in this approach, the variables controlling the transmission of input speech signals from different input/outputs, $\rho_{i,j}(n)$, not only is controlled by the speaker activity of party i but also on any detected cross talk in the various inputs. Particularly, the variables are controlled in the following way: any estimated cross talk between the input of party i and j sets the corresponding variable $\rho_{i,j}(n)$ to 0.

This mitigates the effects of the listener echo of party i perceived by party j due to the possible delay of the transmitted signal from party i compared to the direct path between the two parties. At the same time, due to the reversed check between party j and i this check will also set $\rho_{i,j}(n)$ to 0 which mitigates any talker echo perceived by party i. Furthermore, the same detected cross talk between the input of party i and j sets the corresponding variable $\rho_{j,k}(n), k=A, \ldots, K$ to 0, where i and j have been ordered so that i is the input with the strongest signal level. This mitigates the effects of the listener echo perceived by all listeners due to a possible transmission delay between the correlated speech signals acting as input to the microphone of both parties i and j.

A simple method for performing the cross talk detection can be based on the method presented in Eriksson, 1997 (WO 99/13596), where a computationally efficient algorithm is described which detects the presence of a correlation of the powers of two signals.

In particular, the Eriksson algorithm is based on the powers of the two signals, estimated either using a rectangular window:

$$Rx_i(n) = \sum_{k=0}^{L-1} x_i^2(n-k)$$

where L is in the order of 80 to 200 or a recursive update $$Rx_i(n) = \lambda Rx_i(n) + (1-\lambda)x_i^2(n)$$

where $\lambda$ is in the order of 0.98 to 0.995. Any correlation between the powers of two microphone signals $Rx_i(n)$ and $Rx_j(n)$ can be detected with the aforementioned method, and the corresponding feedback from speaker i to speaker j is set to 0, as described previously.

The previous description is of preferred embodiments for implementing the invention, and the scope of the invention should not necessarily be limited by this description. It should be understood that the present invention is no restricted to implementation in a network based conference bridge configuration, but may also be implemented as a distributed system within the respective terminals where all the microphone signals from all participants are transmitted to all participants. The scope of the present invention is instead defined by the following claims.

What is claimed is:

1. A method for mitigating acoustical cross talk between a plurality of users connected to a mult-party conference bridge, said method comprising the steps of:
   estimating acoustical cross talk from respective input speech signals of said plurality of users; and
   controlling, based on said estimated acoustical cross talk, transmission of input speech signals from said plurality of users to respective loudspeakers for said plurality of users.

2. The method according to claim 1, wherein said step of estimating comprises estimating a matrix of said acoustical cross talk.

3. The method according to claim 1, further comprising, after said step of estimating, filtering said input speech signals with a filter based on said estimated acoustical cross talk.

4. The method according to claim 1, further comprising, after said step of estimating, inverting said estimated acoustical cross talk.

5. The method according to claim 4, wherein said step of controlling, after said step of inverting, filters said input speech signals from said plurality of users with said inverted estimated acoustical cross talk, thereby recovering source speech signals from said plurality of users.

6. The method according to claim 5, further comprising the step of multiplying, prior to said step of filtering, said input speech signals with a matrix of scalar variables.

7. The method according to claim 1, wherein said step of controlling is based on filtering said input speech signals.

8. The method according to claim 7, wherein said filtering is based on said estimated acoustical cross talk.

9. The method according to claim 7, wherein said filtering comprises the step of using a filter of scalar variables.

10. The method according to claim 8, wherein said estimated acoustical cross talk is obtained using the powers of said input speech signals.

11. A method for mitigating acoustical cross talk between a plurality of users connected to a mult-party conference bridge, said method comprising the steps of:
   detecting acoustical cross talk in input speech signals; and
   controlling, based on said detected acoustic cross talk, transmission of input speech signals from said plurality of users to respective loudspeakers for said plurality of users.

12. The method according to claim 11, wherein if said acoustical cross talk is detected between respective microphones of one of said plurality of users and another of said plurality of users, said transmission from said one said plurality of users and said another of said plurality of users, is set equal to zero.

13. The method according to claim 11, wherein, in said step of detecting, at least one of said plurality of users is moving relative to at least one other of said plurality of users.

14. The method according to claim 11, wherein, in said step of detecting, said acoustical cross talk is computed using an algorithm based on powers of two signals.

15. A system for mitigating acoustical cross talk between a plurality of users connected to a multi-party conference bridge, said system comprising:
 a plurality of loudspeakers corresponding to said plurality of users;
 a plurality of microphones corresponding to said plurality of users;
 an estimator for estimating acoustical cross talk from input speech signals; and
 a controller for controlling, based on said estimated acoustical cross talk, transmission of input speech signals from said microphones of said plurality of users to said loudspeakers of said plurality of users.

16. The system according to claim 15, wherein said estimator detects the presence of said acoustical cross talk.

17. The system according to claim 15, wherein said transmission between said microphones and said loudspeakers of said plurality of users is controlled upon detection of said acoustical cross talk.

18. The system according to claim 15, wherein said controller comprises multiplication of said input speech signal by a scalar.

19. The system according to claim 16, wherein said estimator detects presence of said acoustical cross talk using an algorithm based on powers of two signals.

20. The system according to claim 15, wherein said controller filters said input speech signals.

21. The system according to claim 15, further comprising a multi-party bridge connected to said respective pluralities of said loudspeakers and microphones.

22. An apparatus for mitigating acoustical cross talk between a plurality of users connected to a multi-party conference bridge, said apparatus comprising:
 a plurality of loudspeakers corresponding to said plurality of users;
 a plurality of microphones corresponding to said plurality of users;
 an estimator for estimating acoustical cross talk from input speech signals; and
 a controller for controlling, based on said estimated acoustical cross talk, transmission of input speech signals from said microphones of said plurality of users, to said loudspeakers of said plurality of users.

23. The apparatus according to claim 22, wherein a multi-party bridge is connected to said respective pluralities of said loudspeakers and microphones.

24. The apparatus according to claim 22, wherein said estimator detects the presence of said acoustical cross talk.

25. The apparatus according to claim 22, wherein said controller filters said input speech signals.

26. The apparatus according to claim 22, further comprising an inverter for Inverting said estimated acoustical cross talk.

27. The apparatus according to claim 26, wherein said controller filters said input speech signals with said inverted estimated acoustical cross talk.

28. A method for mitigating acoustical cross talk in a multi-microphone conference system having a plurality of users thereof, said method comprising the steps of:
 estimating respective acoustical cross talk from said input speech signals; and
 filtering said input speech signals from said plurality of users with said estimated acoustical cross talk, thereby recovering respective source speech signals from said plurality of users.

29. The method according to claim 28, wherein the step of estimating comprises estimating a matrix of said acoustical cross talk.

30. The method according to claim 28, further comprising the step of inverting, after said step of estimating, said estimated acoustical cross talk.

31. The method according to claim 30, wherein, after said step of inverting, said step of filtering, filters said input speech signals from said plurality of users with said inverted estimated acoustical cross talk, thereby recovering said respective source speech signals from said plurality of users.

32. The method according to claim 28, further comprising the step of multiplying, prior to said step of filtering, said input speech signals with a matrix of scalar variables.

33. The method according to claim 28, wherein said step of estimating is performed by detecting the presence of acoustical cross talk.

34. The method according to claim 33, wherein, in said step of detecting, at least one of said plurality of users is moving relative to at least one other of said plurality of users.

35. The method according to claim 33, wherein, in said step of detecting, said acoustical cross talk is computed using an algorithm based on powers of two signals.

36. A multi-party conference system for mitigating acoustical cross talk, said system comprising:
 a plurality of loudspeakers and microphones for a corresponding plurality of users;
 a multi-party bridge connected to said plurality of loudspeakers and microphones;
 an estimator, within said multi-party bridge, for estimating acoustical cross talk terms for said plurality of users; and
 a filter for filtering respective input speech signals from said plurality of users with said estimated acoustical cross talk terms, thereby recovering respective source speech signals from said plurality of users.

37. The system according to claim 36, wherein said acoustical cross talk terms comprise a matrix.

38. The system according to claim 36, further comprising an Inverter for inverting said estimated acoustical cross talk terms for said plurality of users.

39. The system according to claim 38, wherein said filter filters respective input speech signals from said plurality of users with said inverted estimated acoustical cross talk terms, thereby recovering respective source speech signals from said plurality of users.

40. The system according to claim 36, wherein said filter is based on said estimated acoustical cross talk matrix.

41. The system according to claim 36, wherein said estimator detects the presence of said acoustical cross talk.

42. The system according to claim 41, wherein said acoustical cross talk is detected using an algorithm based on powers of two signals.

43. An apparatus for mitigating acoustical cross talk in a multi-party conference system having a plurality of users thereof, said apparatus comprising:
 a plurality of speakers and microphones for a corresponding plurality of users;

a multi-party bridge connected to said plurality of speakers and microphones;

an estimator, within said multi-party bridge, for estimating respective acoustical cross talk terms for said plurality of users; and a filter for filtering respective input signals from said plurality of users with said estimated acoustical cross talk terms, thereby recovering respective source speech signals from said plurality of users.

44. The apparatus according to claim 43, wherein said acoustical cross talk terms comprise a matrix.

45. The apparatus according to claim 43, wherein said filter is based on an estimated acoustical cross talk matrix.

46. The apparatus according to claim 43, further comprising an inverter for inverting said estimated acoustical cross talk terms for said plurality of users.

47. The apparatus according to claim 46, wherein said filter filters respective input signals form said plurality of users with said inverted estimated acoustical cross talk terms, thereby recovering respective source speech signals from said plurality of users.

48. The apparatus according to claim 43, wherein said estimator detects the presence of acoustical cross talk.

49. The apparatus according to claim 48, wherein said acoustical cross talk is detected using an algorithm based on powers of two signals.

* * * * *